US012358278B2

(12) United States Patent
Mogi et al.

(10) Patent No.: US 12,358,278 B2
(45) Date of Patent: Jul. 15, 2025

(54) RECORDING APPARATUS AND CONTROL METHOD

(71) Applicant: CANON KABUSHIKI KAISHA, Tokyo (JP)

(72) Inventors: Sae Mogi, Kanagawa (JP); Kazuo Suzuki, Kanagawa (JP); Masataka Kato, Kanagawa (JP); Masaki Nitta, Kanagawa (JP); Takeshi Murase, Kanagawa (JP); Hiroshi Taira, Tokyo (JP); Hiroshi Kawafuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 18/049,576

(22) Filed: Oct. 25, 2022

(65) Prior Publication Data

US 2023/0134991 A1 May 4, 2023

(30) Foreign Application Priority Data

Oct. 29, 2021 (JP) ................................ 2021-178319

(51) Int. Cl.
*B41J 2/045* (2006.01)

(52) U.S. Cl.
CPC ....... *B41J 2/04541* (2013.01); *B41J 2/04573* (2013.01); *B41J 2/0458* (2013.01)

(58) Field of Classification Search
CPC .. B41J 2/04541; B41J 2/04573; B41J 2/0458; B41J 2/04563; B41J 2/04591; B41J 2/04528
See application file for complete search history.

(56) References Cited

U.S. PATENT DOCUMENTS 6,827,413 B1 * 12/2004 Kawatoko ............ B41J 2/04568
347/14

FOREIGN PATENT DOCUMENTS

JP 2002096470 A 4/2002

* cited by examiner

*Primary Examiner* — Thinh H Nguyen
(74) *Attorney, Agent, or Firm* — Canon U.S.A., Inc., IP Division

(57) ABSTRACT

A recording apparatus includes recording elements to eject ink, heating elements to heat the ink, and a common wiring through which the recording elements and the heating elements are applied with a voltage. The recording apparatus determines a drive pulse applied to the recording elements based on the number of recording elements to be simultaneously driven and the number of heating elements to be simultaneously driven.

14 Claims, 17 Drawing Sheets

FIG. 8

| HEAD TEMPERATURE | DRIVE PULSE NUMBER |
|---|---|
| 30°C | 34 |
| 31°C | 33 |
| 32°C | 32 |
| · | |
| · | |
| · | |
| 60°C | 0 |

FIG. 9

| HEATER RANK | DRIVE PULSE NUMBER | | | | | |
|---|---|---|---|---|---|---|
| | 0 | 1 | 2 | ... | | 34 |
| 1 | 0.400 us | 0.410 us | 0.420 us | ... | | 0.740 us |
| 2 | 0.405 us | 0.415 us | 0.425 us | ... | | 0.745 us |
| 3 | 0.410 us | 0.420 us | 0.430 us | ... | | 0.750 us |
| . | . | | | | | . |
| . | . | | | | | . |
| . | . | | | | | . |
| 50 | 0.645 us | 0.655 us | 0.665 us | ... | | 0.985 us |

FIG. 10A

| SIMULTANEOUS DRIVE NUMBER OF RECORDING ELEMENTS | PULSE MODULATION AMOUNT (us) |
|---|---|
| 0 TO 10 | 0 |
| 11 TO 50 | 0.1 |
| 51 TO 70 | 0.2 |
| ... | ... |
| 270 TO 300 | 1.0 |

FIG. 10B

| SIMULTANEOUS DRIVE NUMBER OF HEATING ELEMENTS | PULSE MODULATION AMOUNT (us) |
|---|---|
| 0 TO 10 | 0 |
| 11 TO 50 | 0.1 |

FIG. 11

| | PULSE MODULATION AMOUNT(us) | |
|---|---|---|
| SIMULTANEOUS DRIVE NUMBER OF HEATING ELEMENTS | ENVIRONMENT TEMPERATURE AT 20°C OR ABOVE | ENVIRONMENT TEMPERATURE BELOW 20°C |
| 0 TO 15 | 0 | 0.1 |
| 16 TO 30 | 0.1 | 0.2 |
| 31 TO 45 | 0.2 | 0.3 |

FIG. 12

< RECORDING ELEMENT COLUMN 11 >

| SIMULTANEOUS DRIVE NUMBER OF RECORDING ELEMENTS | PULSE MODULATION AMOUNT (us) |
|---|---|
| 0 TO 10 | 0 |
| 11 TO 50 | 0.1 |
| 51 TO 70 | 0.2 |
| 71 TO 100 | 0.3 |

< RECORDING ELEMENT COLUMN 12 >

| SIMULTANEOUS DRIVE NUMBER OF RECORDING ELEMENTS | PULSE MODULATION AMOUNT (us) |
|---|---|
| 0 TO 10 | 0 |
| 11 TO 50 | 0.15 |
| 51 TO 70 | 0.3 |
| 71 TO 100 | 0.45 |

DISTANCE FROM CONTACT PAD
RECORDING ELEMENT COLUMN 11 <
RECORDING ELEMENT COLUMN 12 <
RECORDING ELEMENT COLUMN 13

< RECORDING ELEMENT COLUMN 13 >

| SIMULTANEOUS DRIVE NUMBER OF RECORDING ELEMENTS | PULSE MODULATION AMOUNT (us) |
|---|---|
| 0 TO 10 | 0 |
| 11 TO 50 | 0.2 |
| 51 TO 70 | 0.4 |
| 71 TO 100 | 0.6 |

FIG. 14A

| ENVIRONMENT TEMPERATURE | HEATING ELEMENT DRIVE NUMBER RESTRICTION | MAXIMUM HEATING ELEMENT DRIVE NUMBER |
|---|---|---|
| BELOW 20°C | PRESENT | 30 |
| 20°C OR ABOVE | ABSENT | – |

FIG. 14B

| SHEET TYPE | PRINT QUALITY | PASS NUMBER | DRIVE FREQUENCY | HEATING ELEMENT DRIVE NUMBER RESTRICTION | MAXIMUM HEATING ELEMENT DRIVE NUMBER |
|---|---|---|---|---|---|
| PLAIN PAPER | FINE | 4 | 18 kHz | PRESENT | 30 |
| PLAIN PAPER | STANDARD | 1 | 18 kHz | PRESENT | 30 |
| GLOSSY PAPER | FINE | 16 | 15 kHz | ABSENT | – |
| GLOSSY PAPER | STANDARD | 8 | 15 kHz | ABSENT | – |

FIG. 15

| MAXIMUM HEATING ELEMENT DRIVE NUMBER | HEATING TARGET TEMPERATURE |
|---|---|
| 30 | NORMAL HEATING TARGET TEMPERATURE + 5°C |
| 20 | NORMAL HEATING TARGET TEMPERATURE + 10°C |

RECORDING APPARATUS AND CONTROL METHOD

BACKGROUND

Field of the Disclosure

The present disclosure relates to a recording apparatus including a recording element configured to eject ink, and a control method.

Description of the Related Art

A print head including recording elements corresponding to heaters configured to eject ink is used in a recording apparatus that records an image. To stably eject the ink from the recording elements, some print heads are provided with heating elements called sub-heaters configured to control an ink temperature by heating or warming in addition to the recording elements. In such an image recording apparatus, a control is performed for warming the print head to a temperature set as a target before start of image recording, and maintaining the target temperature even after the start of the image recording.

On the other hand, the number of recording elements to be simultaneously driven in the print head varies depending on an image to be recorded, and an issue occurs that a current from a power supply of a recording apparatus main unit fluctuates. Accordingly, an amount of voltage drop caused by a resistance of a wiring that connects the recording apparatus main unit to the print head changes. In particular, in a case where a voltage to be applied to the print head is constant, a voltage applied to the recording elements also fluctuates depending on the image to be recorded.

Such a fluctuation of the voltage to be applied to the recording elements leads to a fluctuation of energy for ejecting the ink as droplets, which affects an ejection amount or ejection speed of the ink. As a result, density unevenness or landing point misalignment of the ink droplets on a recorded image or defective ejection of the ink droplets may occur in some cases.

To deal with the above-mentioned issue, Japanese Patent Laid-Open No. 2002-96470 describes that a drive pulse of a voltage to be applied to recording elements at the time of recording of an image is controlled based on the number of recording elements to be simultaneously driven.

SUMMARY

According to an aspect of the present disclosure, there is provided a recording apparatus including a recording head including a plurality of recording elements configured to eject ink, a plurality of heating elements configured to heat the ink, and a common wiring to which the plurality of recording elements and the plurality of heating elements are connected in common for an application of a drive voltage from a drive power supply, an obtaining unit configured to obtain both a first number of recording elements to be driven in a predetermined period of time among the plurality of recording elements and a second number of heating elements to be driven in the predetermined period of time among the plurality of heating elements, and a control unit configured to determine, based on the first number and the second number, a drive pulse for applying a voltage to the plurality of recording elements, and to respectively control driving of the plurality of recording elements and driving of the plurality of heating elements, based on the determination.

Further features of the present disclosure will become apparent from the following description of exemplary embodiments with reference to the attached drawings.

BRIEF DESCRIPTION OF THE DRAWINGS

FIG. 8 is a table illustrating a drive pulse number according to a head temperature.

FIG. 9 is a table illustrating a basic pulse width corresponding to the head temperature and the drive pulse number.

FIGS. 10A and 10B are tables illustrating a modulation amount corresponding to a simultaneous drive number of each of recording elements and heating elements.

FIG. 11 is a table illustrating a modulation amount corresponding to the simultaneous drive number of the heating elements according to an environment temperature.

FIG. 12 is a table illustrating a modulation amount corresponding to the simultaneous drive number of the recording elements.

FIGS. 14A and 14B are tables illustrating a modulation amount of a drive pulse.

FIG. 15 is a table illustrating a heating target temperature according to a maximum drive number of the heating elements.

DESCRIPTION OF THE EMBODIMENTS

First Embodiment

Hereinafter, an embodiment of the present disclosure will be described with reference to the drawings. To briefly describe a feature configuration, an outline of an apparatus configuration, a head configuration, an electric element, and the like which are common among respective embodiments will be described.

In the present specification, "recording" includes not only a case where meaningful information such as a character or a graphic form is formed, but also includes other cases whether the information to be formed is meaningful or meaningless. In addition, whether or not the information is in an elicitation form such that a person can visually perceive the information, "recording" also broadly represents a case where an image, a design, a pattern, or the like is formed on a recording medium or a case where a medium is processed.

The "recording medium" represents not only paper used in a general recording apparatus but also broadly represents a material that can accept ink such as cloth, plastic/film, metallic plate, glass, ceramics, wood, or leather.

The "ink" (which may be also referred to as a "liquid") is to be broadly interpreted similarly as in a definition of "recording" described above. Therefore, the ink represents a liquid that may be used for the formation of the image, the design, the pattern, or the like or the process of the recording medium or processing of the ink by being applied onto the recording medium, for example, solidification or insolubilization of a coloring material in the ink applied to the recording medium.

A "recording element" collectively refers to an element configured to generate energy utilized for ink ejection.

Unless otherwise specified, a "nozzle" represents an ejection opening and a fluid channel communicating with the ejection opening.

A substrate for a print head which is used according to the present embodiment does not only refer to a simple substrate formed of silicon semiconductor but also refers to a configuration in which respective elements, wirings, and the like are provided. In addition, being on the substrate not only refers to simply being on an element substrate but also indicates a surface of the element substrate and an internal side of the element substrate in the vicinity of the surface.

Description on Configuration of Recording Apparatus

Figure 1:
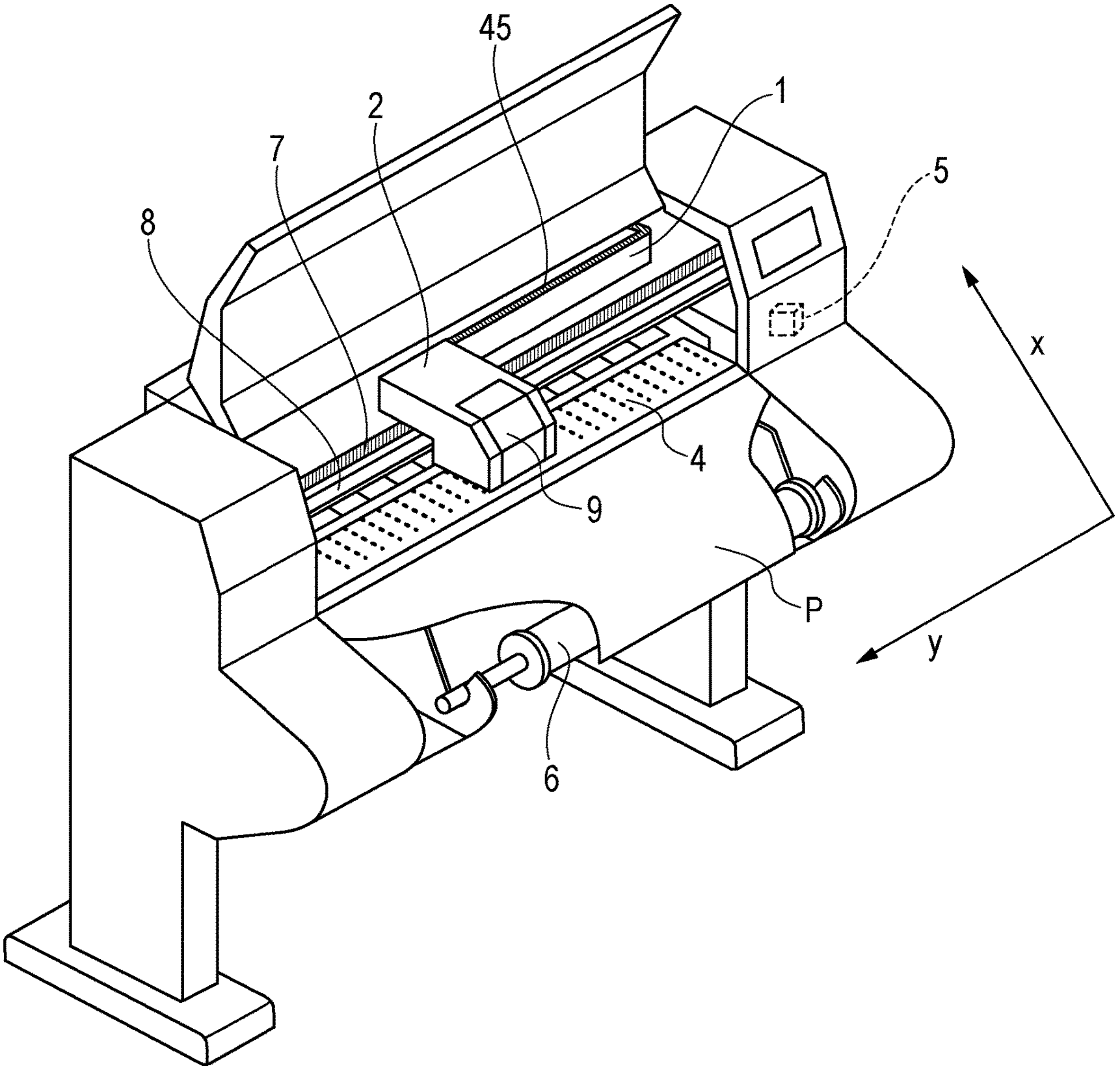
FIG. 1 is an external view of a recording apparatus.

FIG. 1 is an external view of a recording apparatus according to the present embodiment. The recording apparatus of the present embodiment is a so-called serial scanning-type ink jet recording apparatus. A carriage unit 2 on which the print head is installed is caused to scan in a main scanning direction intersecting with a conveyance direction of a recording medium P. By applying the ink as recording agent to the recording medium P during this scan, an image is recorded on the recording medium P. In the drawings, an X direction is the conveyance direction of the recording medium P, a Y direction is the scanning direction of the carriage unit 2, and a Z direction is a vertical direction.

With reference to FIG. 1, a configuration of the recording apparatus and an overview of an operation at the time of recording will be described. First, the recording medium P is fed from a spool 6 that holds the recording medium P by a sheet feeding roller that is not illustrated in the drawing which is driven via a gear by a sheet feeding motor 29. On the other hand, the carriage unit 2 is caused to scan along a guide shaft 8 extending in a direction orthogonal to the conveyance direction by a carriage motor which is not illustrated in the drawing in a predetermined conveyance position. In a process of this scan, an ejection operation for ejecting ink from a nozzle of a print head 9 detachably mounted to the carriage unit 2 is carried out at a timing based on a position signal obtained by an encoder 7. Accordingly, an image is recorded in an area for a bandwidth corresponding to a nozzle array range. The carriage unit 2 of the present embodiment scans at a scanning speed of 40 inches per second, and performs the ejection operation at a recording resolution of 600 dpi (dot per inch).

After that, a conveyance operation for conveying the recording medium P is carried out, and an image is recorded with regard to an area for a next bandwidth. In such a recording apparatus described above, the conveyance operation for the bandwidth may be carried out between respective scans or the conveyance operation may be carried out after the scan of the carriage unit 2 is performed multiple times instead of carrying out the conveyance operation after each scan. In addition, in each scan, the ejection operation is carried out based on data thinned out using a mask pattern for thinning out image data to perform the conveyance operation for the amount equivalent to 1/n of the bandwidth between respective scans. By the above-described method, it is possible to perform so-called multipass recording in which by using different nozzles for recording in a unit area, an image is completed by the scan and the conveyance operation which are performed n times (n: a natural number higher than or equal to 2).

Recording elements configured to eject ink as droplets are arranged inside the plurality of nozzles provided in the print head 9. In addition, a flexible wiring substrate 1 is attached which is configured to supply a signal pulse for driving the recording elements, a signal for head temperature adjustment, and the like. The other terminal of the flexible wiring substrate 1 is connected to a control circuit configured to execute a control of the recording apparatus.

A carriage belt is used for transmission of driving force from a carriage motor 3 to the carriage unit 2. Instead of the carriage belt, for example, other driving systems can also used such as a mechanism including a lead screw which is rotationally driven by the carriage motor 3 and extends in the main scanning direction, and an engagement portion provided in the carriage unit 2 to be engaged with a groove of the lead screw.

The fed recording medium P is nipped and conveyed by the sheet feeding roller and a pinch roller to be guided to a recording position on a platen 4. This recording position is a position in the area to be scanned by the carriage unit 2, and is a position where an image can be recorded. Normally, in a pause state, an orifice face on which the nozzles of the print head 9 are provided is capped. For this reason, prior to the recording, a cap is released to establish a state in which the print head 9 and the carriage unit 2 can perform the scan. Thereafter, once recording data for one scan is accumulated in a buffer, the carriage unit 2 is caused to scan by the drive of the carriage motor 3 to perform a recording operation of an image.

An environment temperature and humidity sensor 5 indicated by a broken line is arranged in a position away from a member corresponding to a vibration source or a heat generation source such as a motor or a heater to reduce an error or measurement noise.

Figure 2A:
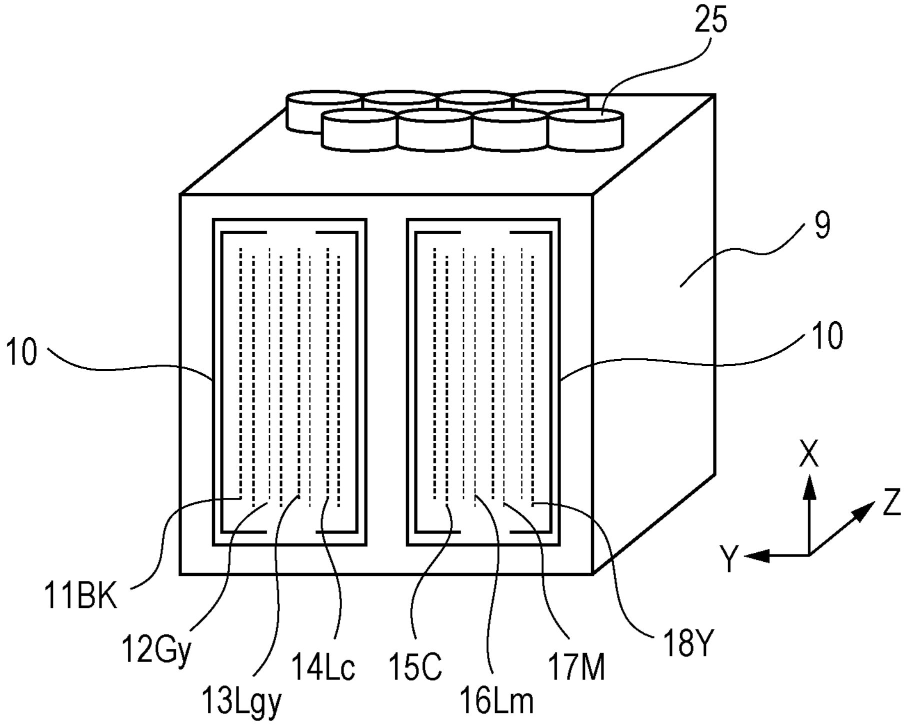
FIGS. 2A, 2B, and 2C are schematic views of a print head.
Figure 2B:
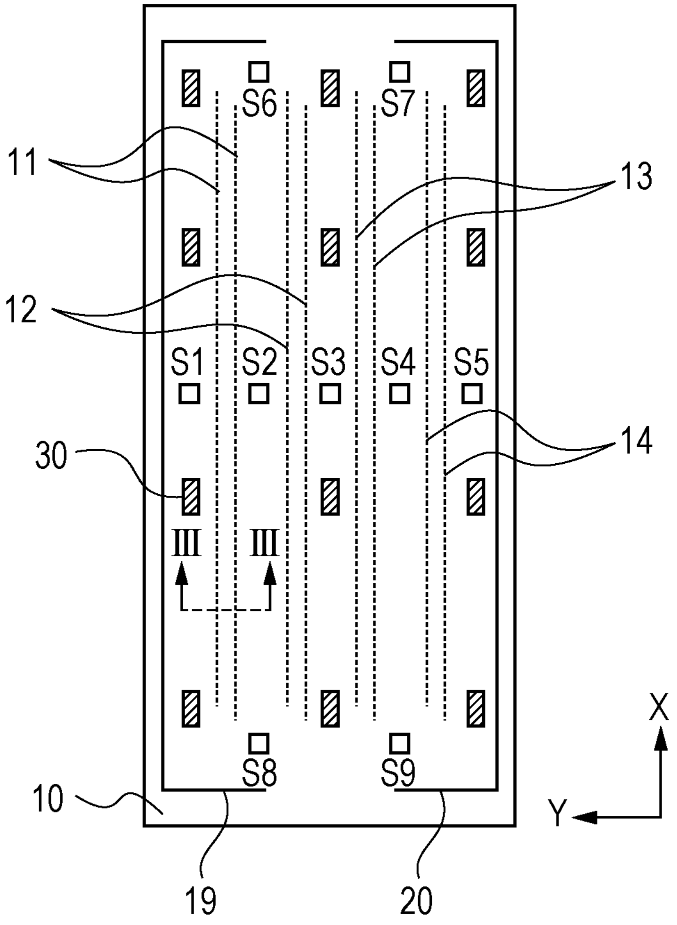
Figure 2C:
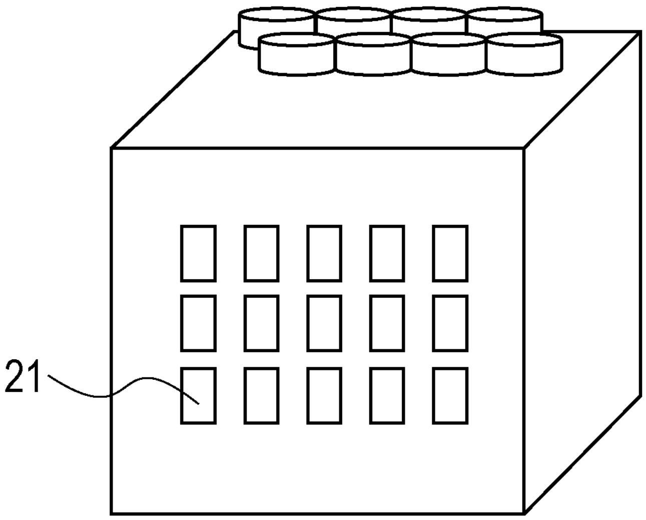

FIGS. 2A, 2B, and 2C are schematic views of the print head 9 according to the recording apparatus of the present embodiment. FIG. 2A illustrates the print head 9 from a direction in which the ink is to be ejected, and FIG. 2B is an expanded view of the recording element substrate on a left side of FIG. 2A. FIG. 2C illustrates a connection part with the recording apparatus on a rear surface side with respect to FIG. 2A.

First, a reference will be made to FIG. 2A. Two recording element substrates 10 are arranged in the print head 9, and a plurality of recording element columns are arranged in those recording element substrates along the main scanning direction in the drawing. A recording element column 11 is a recording element column arranged to eject ink of black (Bk). Similarly, a recording element column 12 is arranged to eject ink of gray (Gy), a recording element column 13 is arranged to eject ink of light gray (Lgy), a recording element column 14 is arranged to eject ink of light cyan (Lc), a recording element column 15 is arranged to eject ink of cyan (C), a recording element column 16 is arranged to eject ink of light magenta (Lm), a recording element column 17 is arranged to eject ink of magenta (M), and a recording element column 18 is arranged to eject ink of yellow (Y). Ink is supplied from an ink common liquid chamber 26 via an ink channel inside the print head 9 to each of the recording element columns.

A reference will be made to FIG. 2B. FIG. 2B is an expanded view of the two recording element substrates 10 juxtaposed in the print head 9. In the print head 9 of the present embodiment, each of the recording element columns 11 to 18 is formed by two recording element columns. In each of the columns, the recording elements are arranged at an interval of 600 dpi, and the recording elements in one of the columns are shifted by 1200 dpi with respect to the recording elements in the other of the columns in the X direction in the drawing. Then, 768 recording elements are arranged in each of the columns, so that 1536 recording elements are arranged in total in the X direction.

In addition, temperature sensors S1 to S10 constituted by diodes are arranged on a recording element substrate 10. The temperature sensors S6, S7, S8, and S9 configured to detect a temperature of the recording element substrate 10 are arranged in an end portion in the X direction. Positions of the temperature sensors S6 to S9 are away from the recording elements in endmost portions of the recording element columns by approximately 0.2 mm in a sub scanning direction. The positions of the temperature sensors S6 to S9 are also intermediate positions of the two recording element columns in the main scanning direction. In addition, the temperature sensors S1, S2, S3, S4, and S5 configured to detect a temperature of the central portion are arranged in a central portion of the recording element columns. These temperature sensors S1 to S5 are also arranged in the central position of the recording element columns.

Warming heaters 19 and 20 are arranged so as to surround the recording element substrate 10. The warming heaters 19 and 20 are in positions at 1.2 mm on an outer side from the recording elements in the endmost portions in the main scanning direction and at 0.2 mm on an outer side from the temperature sensors in the sub scanning direction. A size of the recording element substrate 10 is 9.55 mm wide×39.0 mm long.

A reference will be made to FIG. 2C. The print head 9 and the recording apparatus main unit are electrically connected to each other via a contact pad 21 and a flexible substrate wiring. Accordingly, an electric signal for controlling the ejection or the warming of the ink and electric power consumed in the print head 9 are supplied. Upon connection, a receiving mechanism such as a pin is prepared on the main unit side for fixture, and the print head 9 is pressed to be fixed to the recording apparatus main unit, so that a stable connection can be established. In the print head 9 of the present embodiment, a power supply used for the ejection and a power supply used for the warming are used in common, and also wirings for an application of a drive voltage are used in common. When the number of terminals is reduced by using a common connection wiring, there is an advantage that the circuit can be simplified.

Figure 3:
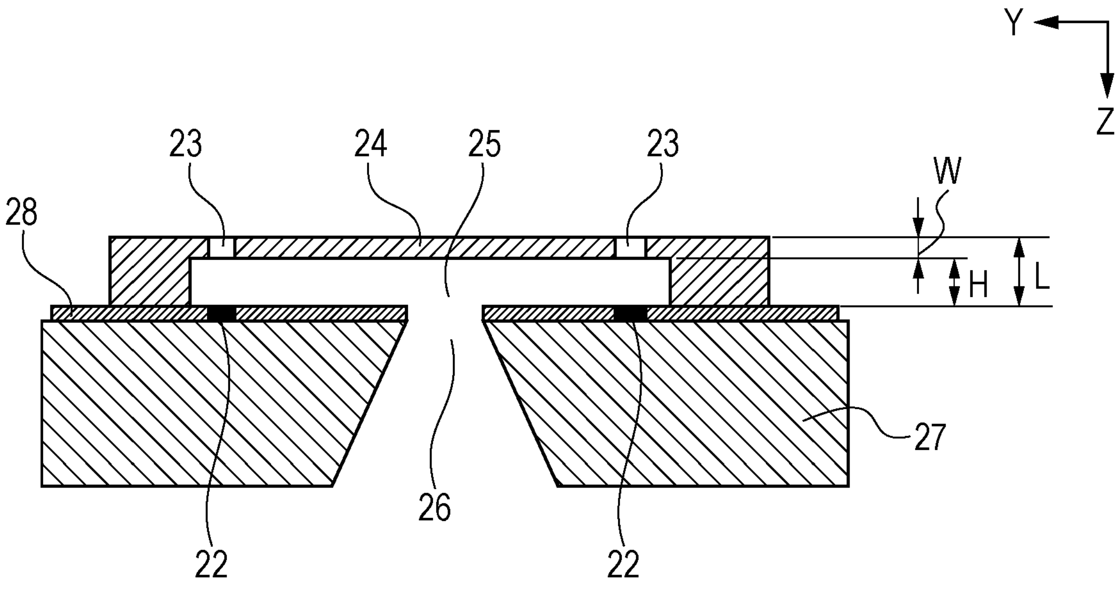
FIG. 3 is a cross-sectional view along a III-III line of a recording element substrate.

FIG. 3 is a cross-sectional view of the recording element substrate 10 along a III-III line of FIG. 2B. The print head 9 of the present embodiment is a so-called thermal system ink jet print head configured to eject the ink by generating thermal energy by being applied with the drive voltage. In FIG. 3, a support substrate 27, the recording elements 22 serving as electrothermal conversion elements, and ejection openings 23 (nozzles) are illustrated.

Ink channels 25 are formed between the support substrate 27 and orifice plate 28. A partition which is not illustrated in the drawing is provided between the plurality of ink channels 25. The recording elements 22 are provided on the support substrate 27 so as to oppose the ejection opening 23, and a protective film or the like is formed on a surface thereof.

The ink is supplied from the common liquid chamber 26 in a position on a bottom side in FIG. 3 towards the respective ink channels 25 located on a top side. In response to the application of the recording elements 22 with the drive voltage, the ink is ejected from the ejection opening as droplets.

In addition, a temperature adjustment control is carried out for maintaining a viscosity of the ink in the print head 9 to be stabilized irrespective of an environment temperature. This temperature adjustment control is carried out by heating elements 30 provided on the recording element substrate 10.

Figure 4:
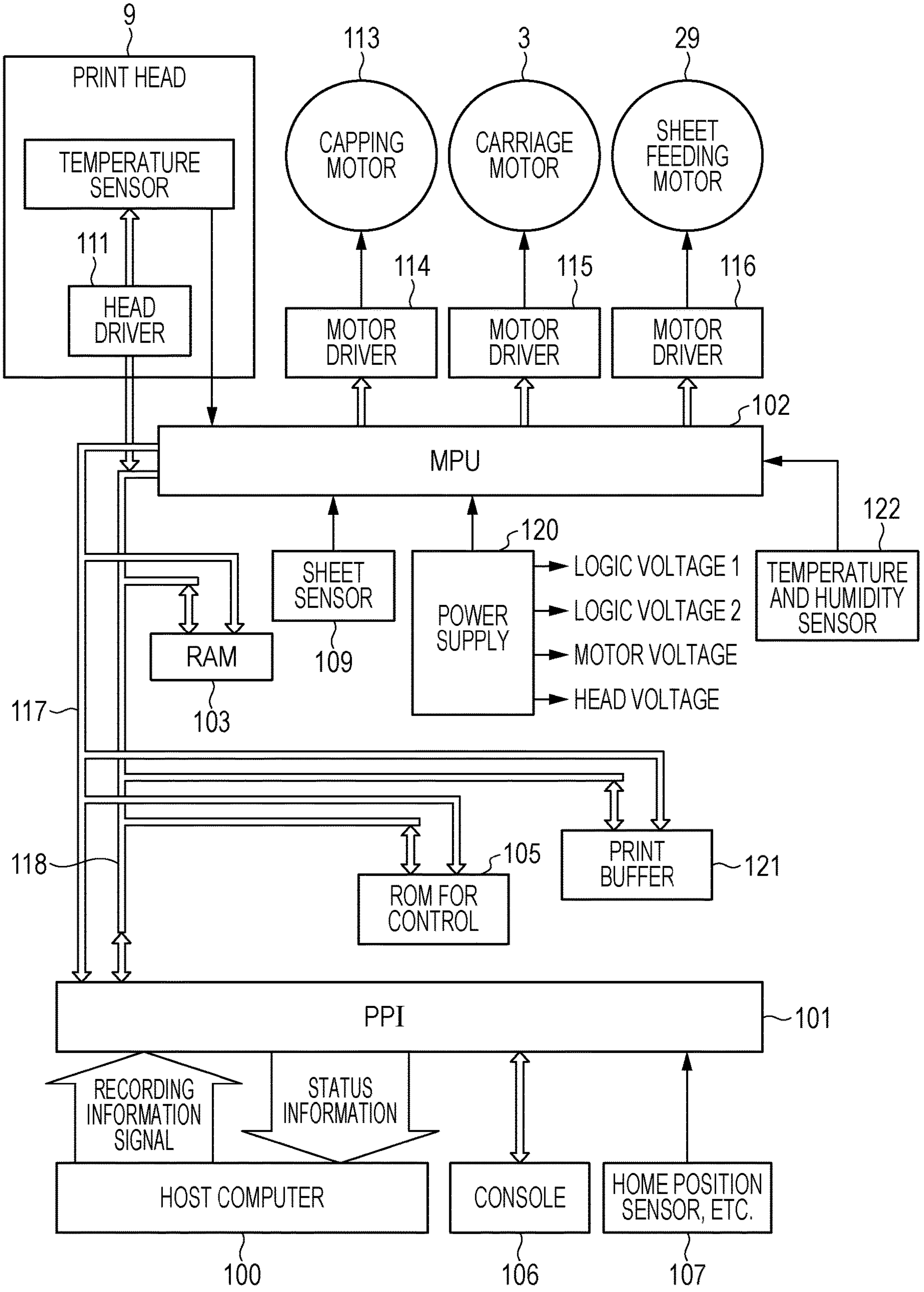
FIG. 4 is a block diagram illustrating an outline of a control configuration of the recording apparatus.

A head driver 111 which will be described below in FIG. 4 is arranged in the print head 9. The head driver 111 is connected to each of the recording elements 22 and the heating elements 30, and can control ON or OFF of a drive current of the recording elements 22 and the heating elements 30.

FIG. 4 is a block diagram illustrating a control configuration of the recording apparatus. A programmable peripheral interface (PPI) 101 is configured to receive an instruction signal (command) transmitted from a host computer 100 or a recording information signal including the recording data and transfer the signal to a micro processing unit (MPU) 102. In addition, when necessary, status information of the recording apparatus is transmitted to the host computer 100. An input and an output are carried out between a setting input unit for a user to perform various types of settings and a console 106 having a display unit configured to display a message to the user or the like. In addition, the PPI 101 accepts signal inputs from a sensor group 107 including a home position sensor and a capping sensor configured to detect that the carriage unit 2 is at a home position.

The micro processing unit (MPU) 102 is configured to control each of the units in the recording apparatus following a control program stored in a ROM 105 for control. A RAM 103 is configured to store a received signal. The RAM 103 is also used as a work area of the MPU 102, and temporarily stores various types of data. A print buffer 121 is configured to store the recording data developed in the RAM 103 or the like, and has a capacity for a plurality of rows. In addition to the above-described control program, the ROM 105 for control can store data to be used in a process of a control which will be described below such as, for example, fixed data corresponding to data or the like for setting a combination of temperature sensors related to a main part of the present embodiment. Each of these units is controlled by the MPU 102 via an address bus 117 and a data bus 118.

Motor drivers 114, 115, and 116 are drivers respectively configured to drive a capping motor 113, the carriage motor 3, and the sheet feeding motor 29 according to the control of the MPU 102.

A sheet sensor 109 is a sensor configured to detect the presence or absence of the recording medium and detect whether or not the recording medium is supplied to a position in which the recording by the print head 9 can be carried out. The head driver 111 is a driver configured to drive the recording elements 22 of the print head 9 according to a recording signal. A temperature and humidity sensor 122 is configured to detect an environment temperature and an environment humidity in an installation environment of the recording apparatus main unit. A power supply 120 is configured to supply a power supply to each of the above-described units, and has an AC adopter and a battery as a drive power supply device.

A recording system constituted by the host computer 100 is configured to supply a recording signal to the recording apparatus. When the recording data is to be transmitted from the host computer 100 via a parallel port, an infrared port, a network, or the like, a predetermined command is added to a lead section of the recording data. For example, a type of the recording medium (plain paper, glossy paper, coated paper, transfer film, thick paper, banner paper, or the like), a medium size (A0 size, A1 size, B0 size, B1 size, or the like), a recording quality (draft, high definition, intermediate definition, emphasis on a particular color, monochrome or color classification, or the like), the presence or absence of automated distinction of an object, or the like is included. In addition, in the case of an application of a treatment liquid for improving a fixability of the ink on the recording medium, information for setting the presence or absence of the application of the treatment liquid is transmitted as a command.

Data necessary for the recording is read from the ROM 105 following these commands, and the recording operation is carried out based on those pieces of data. For example, the data is for determining the number of print passes when the above-described multipass recording is to be performed, an ejection amount of the ink per unit area of the recording medium and a recording direction, and the like. In addition, a mask type for thinning out data which is applied when the multipass recording is to be performed, a drive condition based on a temperature detection value of the print head 9 (for example, a shape of a drive pulse to be applied, an application time period, or the like), a size of a dot, a conveyance condition, the number of ink colors, a carriage speed, or the like may also be determined.

Figure 5:
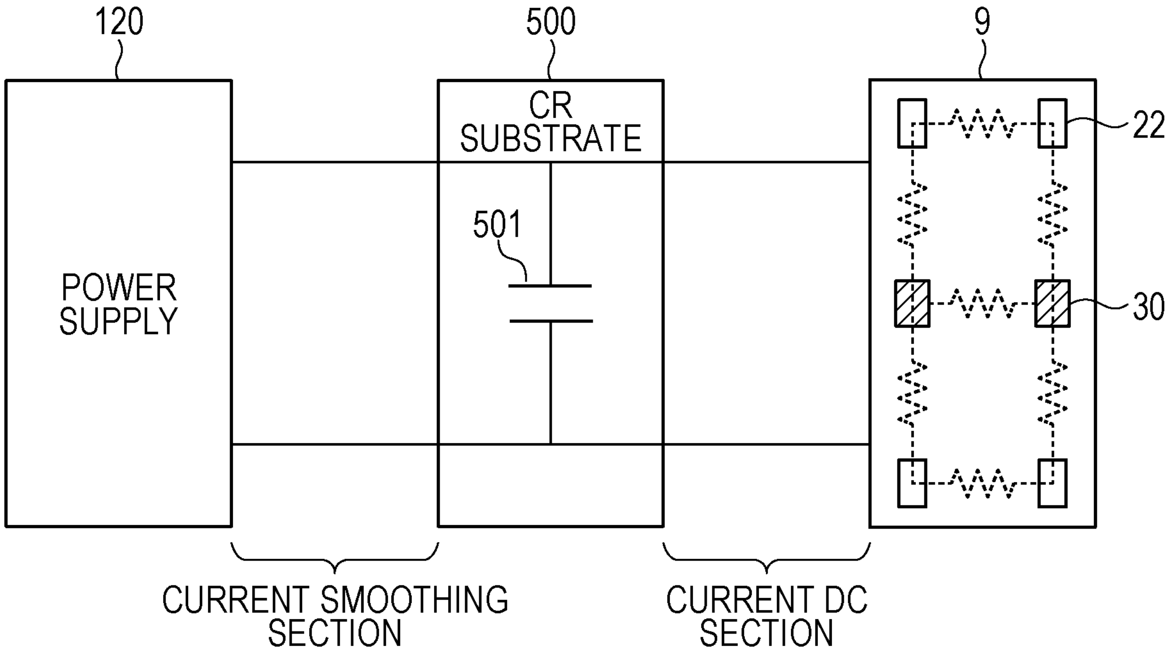
FIG. 5 illustrates a power supply path of the recording apparatus.

FIG. 5 illustrates a power supply path of the recording apparatus of the present embodiment. In the print head 9, the plurality of recording elements 22 and the plurality of heating elements 30 are connected by a common wiring on the recording element substrate 10. According to the present embodiment, these elements are connected by a so-called solid wiring in common.

When a pulsed current is supplied to the recording elements 22 and the heating elements 30, the current is smoothed by an electrolytic capacitor 501 on a CR board 500. Thus, a voltage drop of the current for driving the print head 9 occurs by a wiring resistance in mid-course. The current acts as a pulsed current from the CR board 500 to the print head 9 and acts as a smoothed current from the CR board 500 to the power supply 120 of the main unit, and brings the voltage drop in mid-course. At this time, since the recording elements 22 and the heating elements 30 have a configuration of the common wiring, a voltage drop amount is increased as the numbers of the respective elements to be driven are higher, and also, a voltage fluctuation occurs according to the number of the elements to be simultaneously driven. Due to this voltage fluctuation, an issue occurs that the ejection of the ink droplets from the recording elements 22 is not stably carried out. In view of the above, according to the present embodiment, the number of the recording elements 22 to be simultaneously driven and the number of the heating elements 30 to be simultaneously driven are distinguished, and according to the numbers of the respective elements to be simultaneously driven, a drive pulse of the voltage applied to the recording elements 22 is set. Accordingly, irrespective of the numbers of the respective elements to be simultaneously driven, it becomes possible to supply constant energy.

Figure 6:
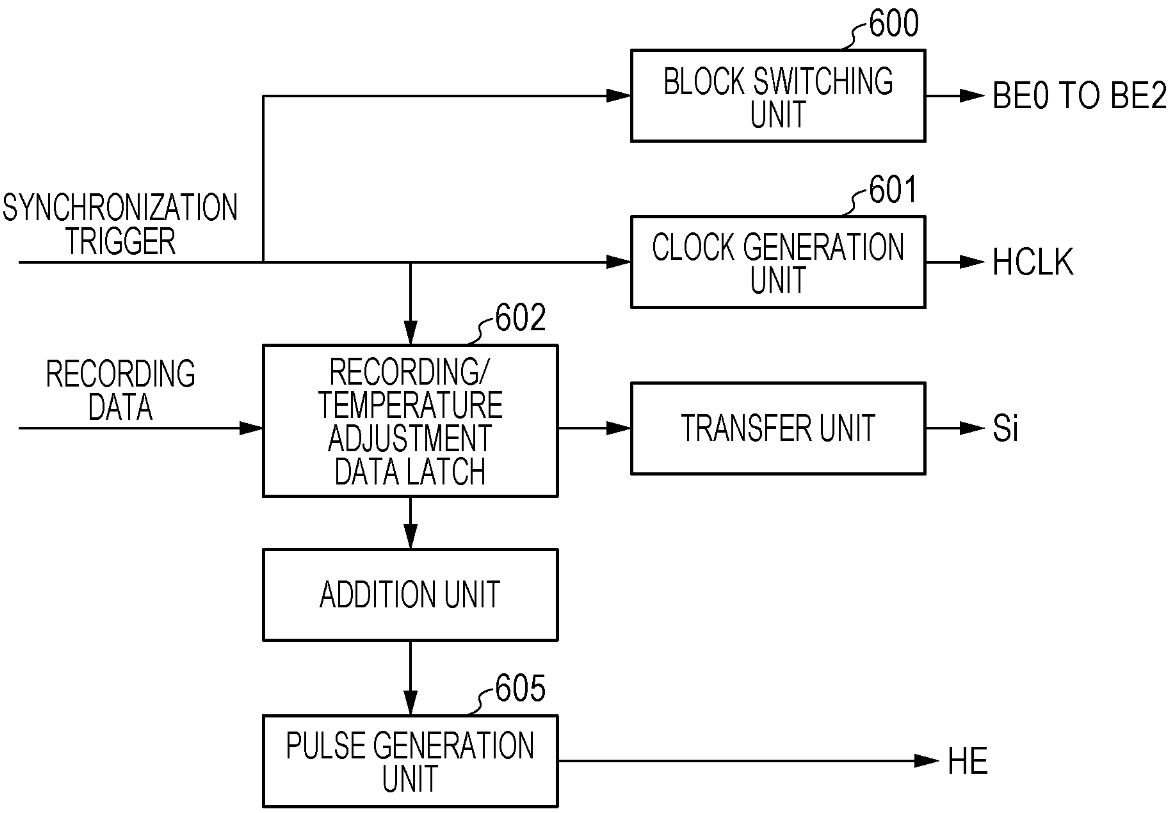
FIG. 6 is a block diagram of a drive signal generation circuit.

FIG. 6 is a block diagram of a drive signal generation circuit of the present embodiment. With reference to FIG. 6, a method of distinguishing the number of the recording elements 22 to be simultaneously driven and the number of the heating elements 30 to be simultaneously driven will be described.

A single block period is set as a reference of a time period of determination processing, and the recording data is transferred to drive nozzles corresponding to the transferred recording data in a next period. In FIG. 6, a description will be provided where a synchronization trigger is set as a reference.

When the synchronization trigger enters, the recording data for the transfer is taken in from a recording buffer to be latched in a recording data latch 602, and also a block signal is switched in a block switch unit 600. Then, in a clock generation unit 601, a clock HCLK signal for transferring the latched recording data to the print head is generated. At this time, both a bit number of the recording data (that is, the number of the recording elements 22 to be driven in a predetermined time period) and a bit number of the heating elements to be driven in the predetermined time period for a temperature adjustment control of the print head in the single latch are obtained. This obtaining operation is carried out in each time period between latch operations.

According to the present embodiment, simultaneous drive numbers refer to the number of the recording elements 22 and the number of the heating elements 30 to be driven between latch intervals, but a configuration may be adopted in which a timing for latching the recording elements 22 and a timing for latching the heating elements 30 are not at the same time. The latch intervals of the heating elements 30 may be late. In this case, the bit number at the immediately preceding latch time point of the heating elements 30 is read and counted with respect to a count of the simultaneous drive number for each latch interval of the recording elements 22. With regard to this addition method, when there is a margin in a block period, it is easy to use a method of enabling the recording data and incrementing a counter up by the HCLK signal. However, when there is no temporal margin, all bits can be added by an adder, and it is also possible to complete distinguishing the simultaneous drive number during the recording data transfer.

A heat pulse signal HE is output from a pulse generation unit 605 by modulating a pulse width. As an example, according to a modulation method of the pulse width, a drive pulse width table illustrated in FIG. 9 which will be described below is stored in the RAM 103, and a necessary modulation amount is read out from the drive pulse width table using the simultaneous drive number as an address to be used for the modulation of the pulse width.

Figure 7:
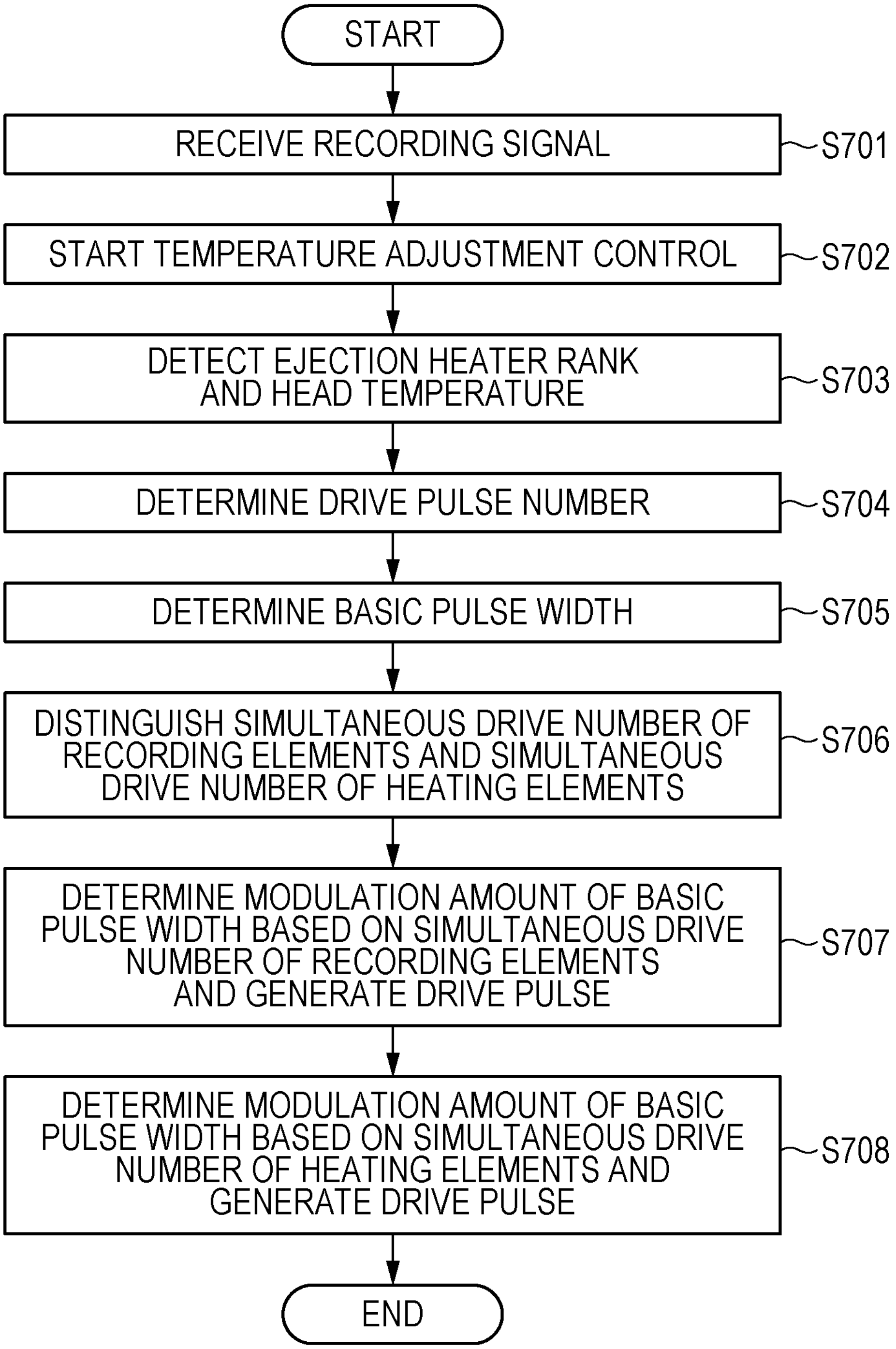
FIG. 7 is a flowchart illustrating drive pulse determination processing.

FIG. 7 is a flowchart illustrating the drive pulse determination processing implemented according to the present embodiment. In step S701, a recording signal for recording an image is received. In step S702, the temperature adjustment control is started. The temperature adjustment control of the present embodiment is a control for driving the heating elements 30 such that a temperature of the print head is increased before recording start to a temperature at which the recording can be started. In step S703, a heater rank with respect to the print head and a head temperature are detected. The heater rank refers to information corresponding to a difference in a resistance value of each of individual pieces of heater boards of the print head, and when this heater rank varies, the pulse width necessary for ejecting the ink droplets from the nozzles varies.

In step S704, with reference to a table in FIG. 8, a drive pulse number indicating a length of an applied basic pulse is determined based on the detected head temperature. In step S705, with reference to a table in FIG. 9, a width of the basic pulse corresponding to the detected head temperature and the determined drive pulse number is determined.

In step S706, the respective simultaneous drive numbers of the recording elements 22 and the heating elements 30 of the print head which are set as processing targets described with reference to FIG. 6 above are separately obtained. In step S707, with reference to a table in FIG. 10A, a modulation amount for modulating the width of the basis pulse corresponding to the obtained simultaneous drive number of the recording elements 22 is determined. In step S708, with reference to a table in FIG. 10B, a modulation amount for modulating the width of the basis pulse corresponding to the obtained simultaneous drive number of the heating elements 30 is determined.

In step S709, the modulation amount according to the simultaneous drive number of the recording elements which is determined in step S707 and the modulation amount according to the simultaneous drive number of the heating elements which is determined in step S708 are added to the basis pulse width determined in step S705. Accordingly, a drive pulse after the modulation is determined.

As described above, the width of the basis pulse determined based on the drive condition such as a characteristic of the print head or the head temperature is modulated by the modulation amount according to the simultaneous drive number of the recording elements 22 and the simultaneous drive number of the heating elements 30, so that a final drive pulse is determined. With the above-described configuration, it is possible to appropriately control the pulse width for correcting the voltage drop due to the increase in the simultaneous drive number. In addition, while a density unevenness or a landing error in a recorded image is avoided, a decrease in a durability of the recording elements 22 can also be suppressed by the drive pulse control based on the simultaneous drive number.

Second Embodiment

According to the first embodiment, the drive pulse is determined based on the simultaneous drive number of the recording elements 22 and the simultaneous drive number of the heating elements 30. According to the present embodiment, to perform a more appropriate pulse correction control by taking into account a difference of the voltage drop amount depending on a type of an element, the modulation amount is weighed based on a modulation amount table corresponding to the drive number of the recording elements 22 and a modulation amount table corresponding to the drive number of the heating elements 30.

In a low temperature environment, even when the temperature adjustment control in step S702 is carried out, an issue occurs that it is difficult for the print head 9 to warm up. To deal with this issue, weighing according to the environment temperature is applied to the modulation amount corresponding to the drive number of the heating elements 30.

FIG. 11 is a table for determining the modulation amount for modulating the width of the basis pulse corresponding to the simultaneous drive number of the heating elements 30 according to the present embodiment. By using the table of FIG. 11 instead of the table of FIG. 10B according to the first embodiment, it is possible to keep an ejection performance to be stabilized. It is noted that the environment temperature is obtained by a temperature and humidity sensor provided in the recording apparatus main unit. It is also noted that a configuration other than this table is similar to that of the first embodiment.

FIG. 12 illustrates an example of a table of a modulation amount corresponding to the number of the simultaneous drive number of the recording elements 22. Since the voltage drop amount is increased as a distance from the contact pad 21 is lengthened, a further weighing is applied to the modulation amount corresponding to the simultaneous drive number of the recording elements 22 according to the positions of the recording element columns. As illustrated in FIG. 2B, the recording element columns 11, the recording element columns 12, and the recording element columns 13 are arranged on the recording element substrate 10 in the stated order from the left in the Y direction in the drawing. That is, the recording element columns 11, the recording element columns 12, and the recording element columns 13 are arranged in ascending order of the distance from the contact pad 21, and the width of the modulation amount corresponding to the drive number is further increased for the recording elements included in the recording element columns with the longer distance from the contact pad.

As described above, according to the present embodiment, the still more accurate pulse correction control can be carried out based on the characteristic of the element, the environment temperature of the recording apparatus, and the configuration of the recording element substrate.

Third Embodiment

Next, a third embodiment will be described. It is effective to expand the pulse width to suppress an image defect derived from the voltage fluctuation applied to the recording elements of the print head 9 as described above. On the other hand, in general, a length of the pulse width that can be input has a limit in view of a specification of the recording element substrate. For this reason, the energy applied to the recording elements 22 may be insufficient in a low temperature environment. In addition, even in a case where a drive frequency is high, a maximum pulse width that can be input is shortened, and therefore the energy applied to the recording elements 22 may be insufficient.

To deal with this, according to the present embodiment, processing for increasing a heating target temperature of the print head 9 to compensate the energy is executed by setting a maximum drive number of the heating elements 30 for restriction according to the environment temperature or a recording mode.

Figure 13:
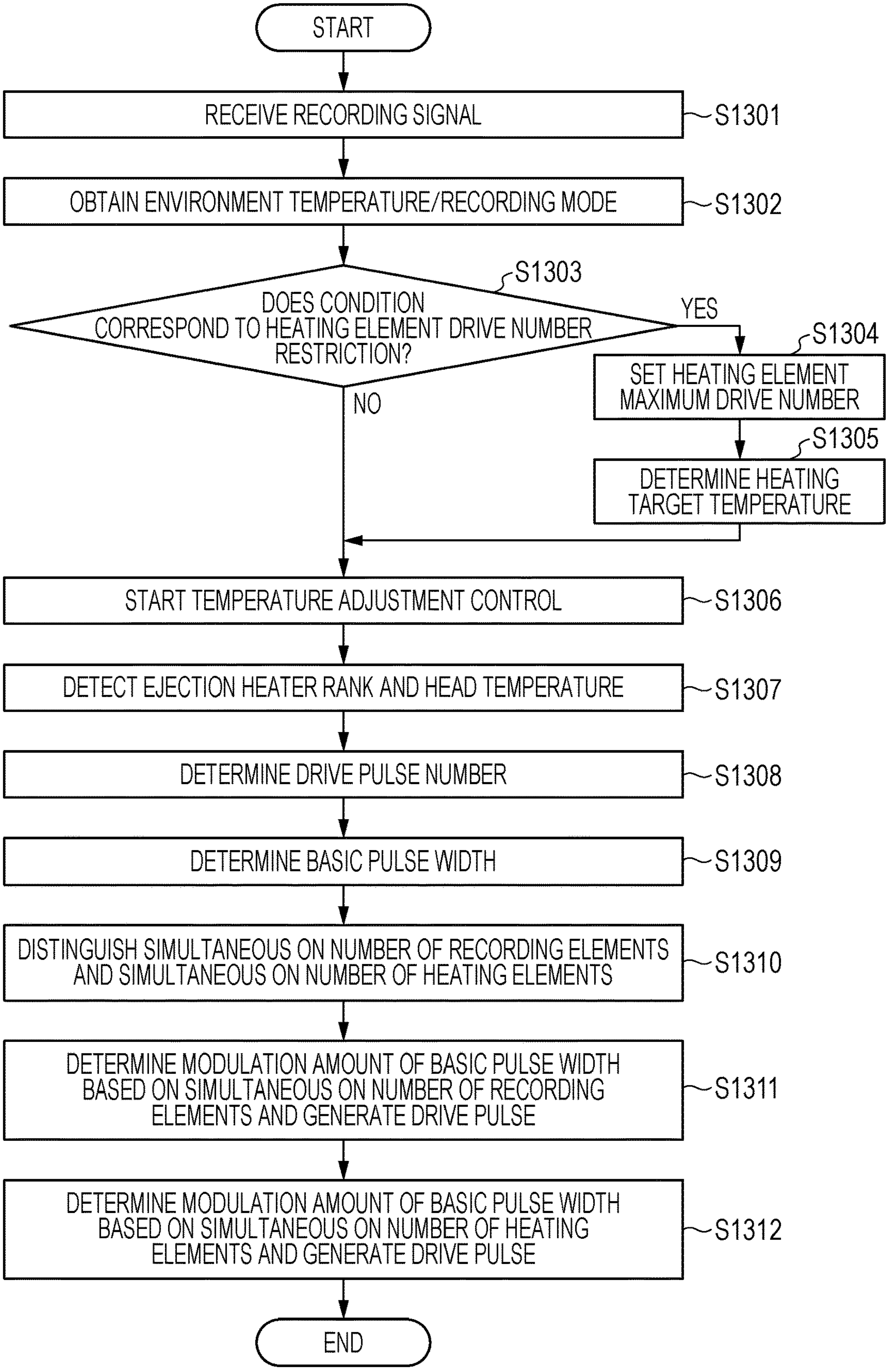
FIG. 13 is a flowchart illustrating drive pulse determination processing.

FIG. 13 is a flowchart illustrating processing to be executed according to the present embodiment. A description of processing similar to that of the first embodiment will be omitted. In step S1302, an environment temperature and record mode information are obtained. In step S1303, with reference to tables in FIGS. 14A and 14B, it is determined whether or not a state corresponds to a condition for restricting the maximum drive number of the heating elements 30. FIG. 14A illustrates a condition for a restriction determination of the maximum drive number of the heating elements 30 with respect to the environment temperature, and the maximum drive number of the heating elements 30 with the presence of the restriction, that is, the maximum drive number of the heating elements 30 in a case where it is determined that the restriction is necessary. In a case where the environment temperature corresponds to the condition for restricting the maximum drive number, that is, in a case where the environment temperature is lower than a predetermined environment temperature (20 degrees Celsius in the case of FIG. 14A), in step S1304, the maximum drive number of the heating elements 30 is set. FIG. 14B illustrates a condition for a restriction determination of the maximum drive number of the heating elements 30 with respect to the recording mode, and the maximum drive number of the heating elements 30 in a case where it is determined that the restriction is necessary. In a case where the state corresponds to the recording mode in which it is necessary to decrease the drive number of the heating elements 30, in step S1304, the maximum drive number of the heating elements 30 is set. Next, in step S1305, after the heating target temperature is finally determined with reference to a table in FIG. 15, the flow returns to step S1306, and the processing similar to that of the first embodiment is carried out. In step S1303, when the environment temperature does not correspond to the condition for restricting the maximum drive number of the heating elements 30, the flow proceeds to step S1305, and the processing similar to that of the first embodiment is carried out.

As described above, according to the present embodiment, the drive number of the heating elements 30 is restricted based on the environment temperature. Accordingly, among the modulation amounts to be added to the basic pulse, the modulation amount based on the maximum value of the simultaneous drive number of the heating elements 30 is restricted, and the modulation amount derived from the other condition can be secured.

Other Embodiments

According to the above-described embodiments, the mode has been described where both the modulation amount according to the simultaneous drive number of the recording elements and the modulation amount according to the simultaneous drive number of the heating elements are obtained to be added to the basic pulse, but a mode may also be adopted where one modulation amount is obtained at a time. For example, a sum of the simultaneous drive number of the recording elements and the simultaneous drive number of the heating elements, or a sum of values calculated by multiplying at least one of the simultaneous drive number of the recording elements and the simultaneous drive number of the heating elements by a coefficient to be weighed may be obtained, and the modulation amount may be calculated based on the sum.

In addition, according to the above-described embodiments, the description has been provided to the example of using the recording apparatus including a so-called serial type print head where the carriage unit 2 to which the print head 9 is installed scans in a direction intersecting with a conveyance direction of the recording medium. The present disclosure is not limited to this, and the present disclosure can be also applied to the recording apparatus including a so-called line head where the recording medium is conveyed in a direction intersecting with the array direction of the recording elements.

According to the embodiment of the present disclosure, while the decrease in the durability of the recording elements is suppressed, the drive pulse of the applied voltage can be controlled.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-178319, filed Oct. 29, 2021, which is hereby incorporated by reference herein in its entirety.

What is claimed is:

1. A recording apparatus comprising:

a recording head including a recording element substrate on which a plurality of recording elements and a plurality of heating elements are provided, the plurality of recording elements being configured to eject ink, the plurality of heating elements being configured to heat the ink without ejecting the ink, and a common wiring for an application of a drive voltage from a drive power supply being connected to the recording element substrate;

an obtaining unit configured to obtain both a first number of recording elements to be driven in a predetermined period of time among the plurality of recording elements and a second number of heating elements to be driven in the predetermined period of time among the plurality of heating elements; and a control unit configured to determine, based on the first number and the second number, a drive pulse for applying a voltage to the plurality of recording elements, and to respectively control driving of the plurality of recording elements and driving of the plurality of heating elements, based on the determination.

2. The recording apparatus according to claim 1, wherein the control unit determines the drive pulse by adding a modulation amount based on the first number and the second number to a basic pulse.

3. The recording apparatus according to claim 2, wherein the control unit obtains the basic pulse based on at least one of a heater rank for each individual piece of the print head and a head temperature detected by a temperature sensor.

4. The recording apparatus according to claim 1, wherein the control unit obtains a first modulation amount based on the first number, obtains a second modulation amount based on the second number, and determines the drive pulse by adding the first modulation amount and the second modulation amount to a basic pulse.

5. The recording apparatus according to claim 4, wherein the first modulation amount is set to be longer in a case where the first number is a predetermined number as compared with a case where the first number is lower than the predetermined number.

6. The recording apparatus according to claim 4, wherein the second modulation amount is set to be longer in a case where the second number is a predetermined number as compared with a case where the second number is lower than the predetermined number.

7. The recording apparatus according to claim 4, wherein the second modulation amount is obtained based on the second number and an environment temperature.

8. The recording apparatus according to claim 1, wherein the obtaining unit obtains the first number and the second number each time the predetermined period of time has elapsed, and the control unit determines the drive pulse each time the predetermined period of time has elapsed.

9. The recording apparatus according to claim 1, wherein the obtaining unit obtains the first number and the second number at a timing at which recording data is latched.

10. The recording apparatus according to claim 1, wherein the control unit sets a maximum drive number of the second number based on at least one of an environment temperature and a recording mode.

11. The recording apparatus according to claim 1, wherein each of the plurality of recording elements is provided at a position opposed to corresponding one of a plurality of ejection openings.

12. The recording apparatus according to claim 1, wherein each of the plurality of recording elements is an electrothermal conversion element.

13. The recording apparatus according to claim 1, wherein the plurality of heating elements adjusts temperature so as to maintain a viscosity of the ink inside the recording head.

14. A control method comprising:

obtaining, in a recording head including a recording element substrate on which a plurality of recording elements and a plurality of heating elements are provided, the plurality of recording elements being configured to eject ink, the plurality of heating elements being configured to heat the ink without ejecting the ink, a common wiring for an application of a drive voltage from a drive power supply being connected to the recording element substrate, both a first number of recording elements to be driven in a predetermined period of time among the plurality of recording elements and a second number of heating elements to be driven in the predetermined period of time among the plurality of heating elements; and determining, based on the first number and the second number, a drive pulse for applying a voltage to the plurality of recording elements.

* * * * *